Dec. 15, 1931.                D. J. STEWART                1,836,515
                              DAMPER OPERATOR
                         Filed March 23, 1929         2 Sheets-Sheet 1
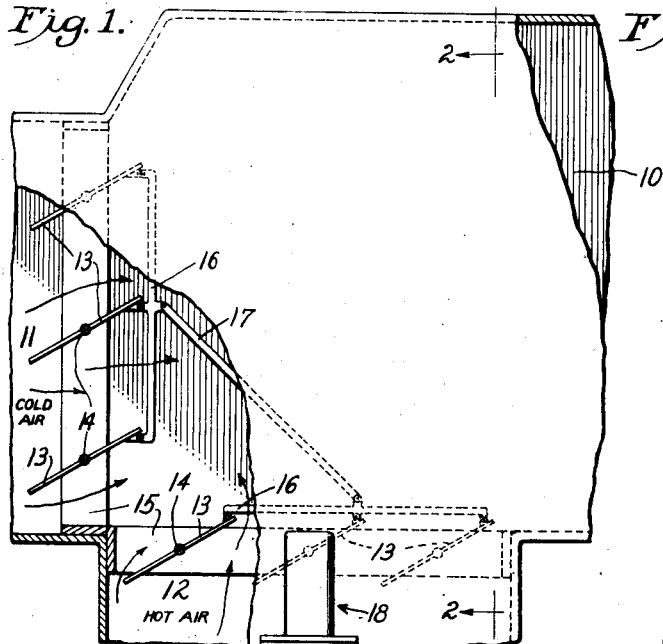
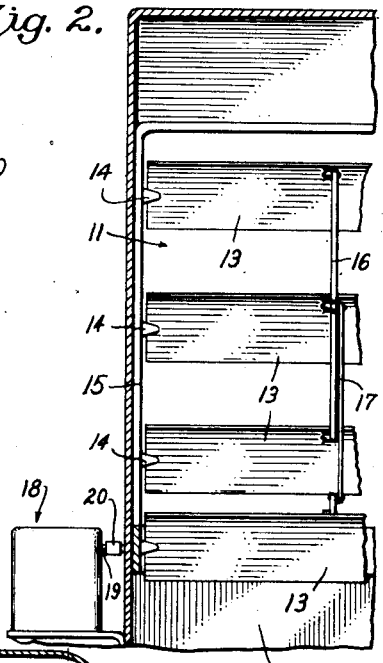
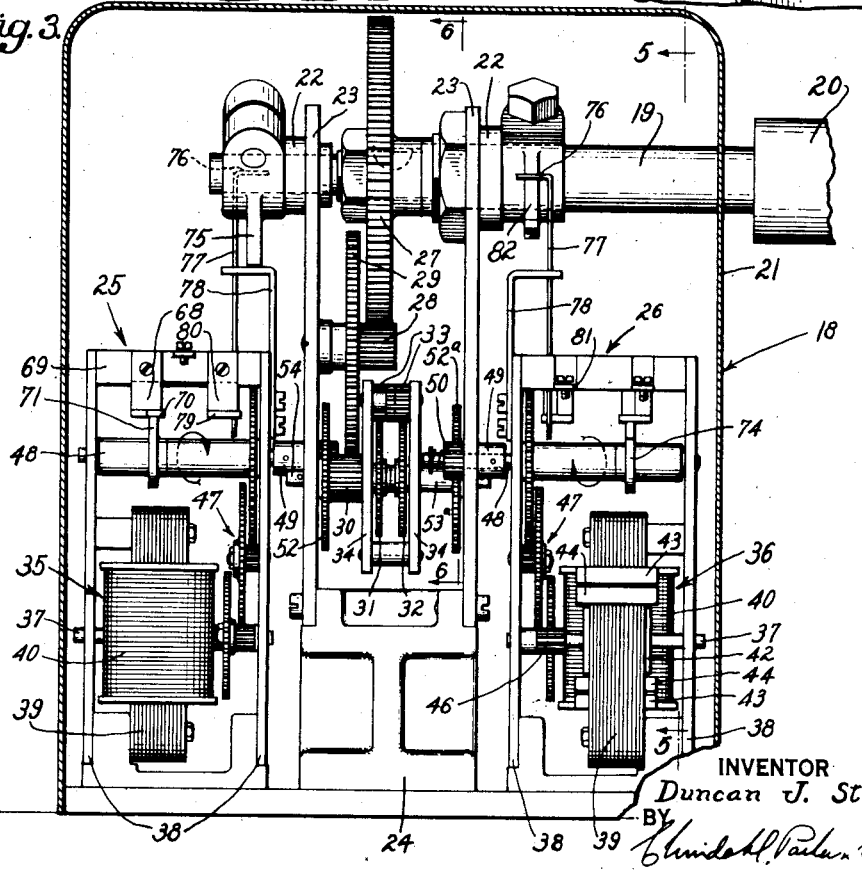
INVENTOR
Duncan J. Stewart
BY
ATTORNEYS Dec. 15, 1931.                D. J. STEWART                1,836,515
                              DAMPER OPERATOR
                          Filed March 23, 1929           2 Sheets-Sheet 2
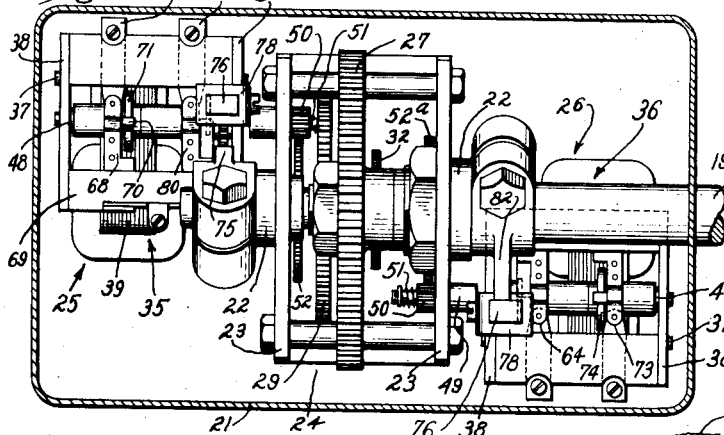
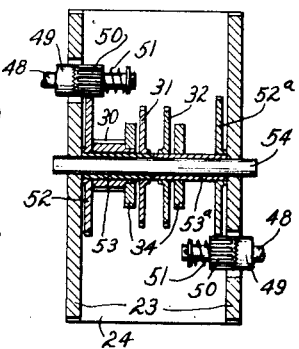
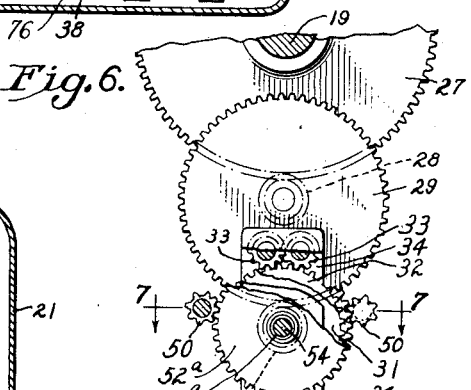
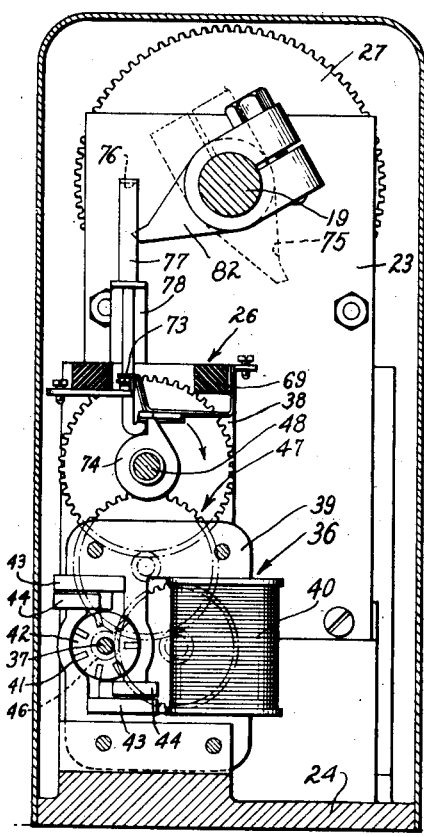
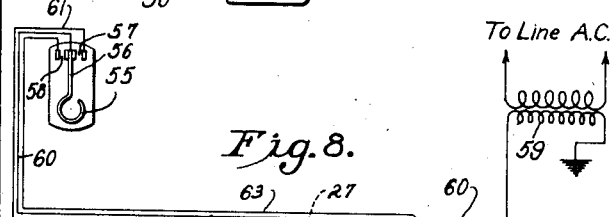
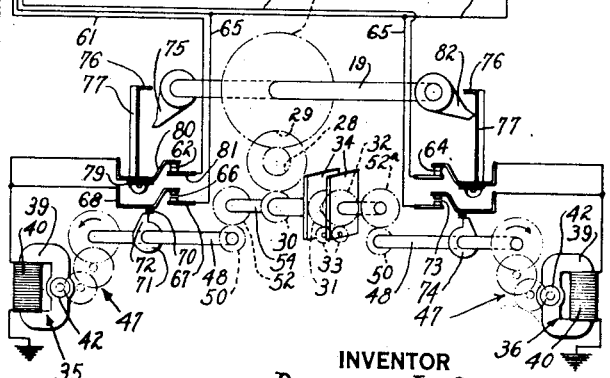
INVENTOR
Duncan J. Stewart
BY
ATTORNEYS Patented Dec. 15, 1931

1,836,515

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

DAMPER OPERATOR

Application filed March 23, 1929. Serial No. 349,325.

This invention relates to improvements in damper operators and more particularly to an operator for effecting a slow and graduated movement of a damper device to regulate the temperature of the air in a heating and ventilating system.

The primary object is to provide an operator of the above general character by which the movement of a damper device in opposite directions to regulate the flow of heating fluid, may be controlled in cycles of variable lengths with greater accuracy and reliability than has been possible with mechanisms heretofore employed.

Another object is to provide a damper operator driven by electric motor means and having mechanism for governing the starting and duration of operation of the motor under the control of a sensitive electric thermostat.

Still another object is to provide a motor driven operating unit for dampers and the like which has a new and improved mechanism for applying the power of the motor driving means to the device to be operated.

A further object is to provide a power driving unit for actuating a damper device or the like arranged for control by a sensitive thermostat and having control means for rendering the driving means temporarily inoperative when the damper device has been moved into a limiting position without having satisfied the temperature requirements determined by the thermostat.

Other objects and advantages of the invention will become apparent from the following detailed description taken in connection with the accompanying drawings, in which Figure 1 is a fragmentary view partially in section showing air mixing conduits controlled by a damper device arranged for operation by a unit embodying the features of the present invention.

Fig. 2 is a section taken along the line 2—2 of Fig. 1.

Fig. 3 is an elevational view of the operating unit with the casing therefor shown in section.

Fig. 4 is a similar plan view of the operating unit.

Figs. 5 and 6 are sectional views taken respectively along the lines 5—5 and 6—6 of Fig. 3.

Fig. 7 is a section taken along the line 7—7 of Fig. 6.

Fig. 8 is a schematic view of the operating parts of the unit and a wiring diagram showing the control circuits.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the illustrative embodiment shown in the drawings, the improved operator is utilized as a means for accurately regulating the temperature of air discharged into a single conduit 10 by controlling the flow of cool and heated air through separate inlet ducts 11 and 12. The proportion of hot and cold air delivered to the mixed air conduit may be controlled by separate dampers in the cold and hot air ducts, each damper comprising a plurality of flat vanes 13 journaled on central end trunnions 14 in a frame 15 near the duct outlet. To move the vanes of each damper in unison, one edge of each vane is pivotally connected to a bar 16. The bars 16 of both dampers are in turn connected by a link 17, and the arrangement is such that one damper will be open when the other is completely closed, that is, when the vanes of the latter are disposed in a common plane. Thus by shifting the member 17 into different positions any desired proportion of hot and cold air may be obtained.

The improved operator, generally designated by the numeral 18 in Figs. 1 and 2 is intended to effect a slow and graduated movement of the damper device in either direction to establish a predetermined temperature of the air after mixing, and to maintain the positions of the dampers so long as such temperature obtains. In the present instance, the operator is equipped with a rotary actuating member in the form of a shaft 19 and is disposed externally of the air ducts, the shaft being coupled, as by means of a sleeve 20, to the extended end trunnion of one of the damper vanes 13.

The shaft 19 projects from a casing 21 and is journaled within the casing in bearings 22 at the upper ends of two rigid standards 23 secured in spaced relation to a base 24 which may be stationarily supported in any suitable manner.

To effect a gradual movement of the dampers in increments of variable lengths and in either direction, the shaft 19 is, in the present instance, arranged to be driven in one direction or the other through the medium of a speed-reducing gear train driven from a mechanism which performs a function in the nature of a clutch and which is in the form of a differential gearing which in turn is driven by two selectively operable motor units indicated by the numerals 25 and 26. All of this gearing is mounted between the standards 23 and a comparatively large speed reduction is effected by employing a large spur gear 27 on the shaft 19 meshing with a spur pinion 28 rigid with a gear 29 which in turn meshes with a pinion in the form of a sleeve 30.

For the sake of compactness in arrangement, the differential gearing is of the so-called spur-gear type, and comprises two coaxially arranged terminal gears 31 and 32 meshing respectively with two pinions 33 which in turn mesh with each other and are rotatably mounted on studs supported between two spaced parallel plates 34. The pinion sleeve 30 is axially alined with the gears 31 and 32 and is made rigid with the plates 34, Fig. 7 so that the plates and the sleeve constitute the intermediate or differentially driven member of the differential gearing.

In view of the well known characteristics of differential gearing, it will be understood that the intermediate member, and hence the pinion 30, will be rotated in one direction when the terminal gear 31 is rotated and the other terminal gear 32 is stationary, but when the gear 31 is stationary and the gear 32 rotates in a reverse direction, the pinion 30 will rotate in a reverse direction. Thus the differential gear may be utilized to turn the main shaft 19 in one direction or the other selectively according to whether one or the other of the terminal gears is driven by their respective motor units 25 and 26, as will presently be described. In performing this function, the differential gear constitutes a double acting clutch, at the same time providing a permanent driving connection between the shaft 19 and each motor unit. With such arrangement the difficulty incident to the mechanical disconnection of the motor units is effectually avoided and this is particularly advantageous in the present environment owing to the necessity for starting and stopping the shaft 19 frequently in order to regulate properly the proportions of hot and cold air.

The motor units 25 and 26 are disposed on opposite sides of the standards 23 and include individual fractional horse power electric motors 35 and 36 whose shafts 37 are journaled at opposite ends in frames individual to the two motors. Each of said frames, as shown, comprises two spaced plates 38 upstanding from and rigidly secured to the base 24.

In order to provide for simplicity in structure and of the control mechanism required, the individual motors preferably are of the single phase induction type, each including a rectangularly shaped field member or stator 39 of laminated construction rigidly secured against the outer frame plate 38 and adapted to be energized by a single winding 40 encircling one leg of the stator. In the opposite leg there is formed a cylindrical opening 41 in which is disposed a rotor 42 of the squirrel-cage type fast on the motor shaft.

As a means for creating a starting torque and contributing to the running torque, two shading rings 43 and 44 of copper or the like are mounted on each stator pole, the ring 43 being larger than the other ring so as to shade a larger area of the pole. When a periodically changing flux is caused to flow through the stator by energizing the winding 40 with alternating current, the flux threading the shaded pole areas will lag behind that in the unshaded pole area. Such time lag in the fluxes over these areas produces a shifting magnetic field causing a starting torque as is well understood in the art.

Adjacent the inner side plate 38, each motor shaft 37 carries a pinion 46 which, through a train 47 of suitable speed reduction gearing mounted on said side plate drives a shaft 48 journaled at opposite ends in the plates 38. Coupled to the inner end of this latter shaft is a collar 49 projecting through the adjacent standard 23 and having a reduced end slidably supporting a pinion 50 (Fig. 7) having end teeth which are urged by a spring 51 into latching engagement with the teeth on the collar 49. A normally engaged connection is thus provided between the pinion 50 and its driving motor, which connection is releasable automatically when a condition of overload is encountered to free the motor unit from the other driving parts.

The pinion 50, driven by the motor 25, meshes with a gear 52 fast on a sleeve 53 (Fig. 7) which carries the terminal gear 31 of the differential and which is rotatable within the pinion sleeve 30, on a shaft 54 supported by the standards 23. Likewise the pinion 50 driven by the motor unit 26 meshes with a gear 52ᵃ on a rotatable sleeve 53ᵃ carrying the other terminal gear 32.

As shown in Figs. 3 and 4, the two motors 35 and 36 are arranged in reverse relation and are thus adapted to drive the respective terminal gears of the differential in opposite directions under the control of switching mechanism later to be described which insures that only one of the motors will operate at a time. As a result of this arrangement, the main shaft 19 will be driven in a direction to open the hot air duct 12 and close the cold air duct 11 when one motor is running and the other is idle, thereby increasing the temperature of the mixed air. Conversely when the other motor is running and the first mentioned one is idle, the shaft 19 will be driven in a direction to close the hot air duct and open the cold air duct, thereby reducing the temperature of the mixed air. In either case, the motor which is idle acts through its speed reduction gearing to hold its terminal gear against rotation.

In order to provide for a slow movement of the dampers, the gearing combinations are so proportioned as to require a continuous operation of either motor preferably for several minutes in order to move the dampers throughout their range of movement in either direction, which range it will be observed corresponds to a quarter revolution of the shaft 19. At this rate of movement, the proportion of the hot and cold air will vary gradually in the operation of either motor thereby avoiding sudden temperature changes. It will also be observed that a substantial part of the speed reduction is effected through the medium of the gearing common to both motor units and that the dampers will move through very small angles for one revolution of the slow speed shafts 48 which it should be noted are rotated in opposite directions by their respective motor units.

Means responsive to the temperature of the mixed air in the duct 10, or to the temperature in the room into which the duct discharges, is provided for governing the operation of the two motor units by selectively controlling the connection of their windings with a source of alternating current. This means may, for example, comprise a thermostat (Fig. 8) having a thermosensitive element 55 with a tongue 56 movable between and cooperating with a pair of spaced contacts to form two switches 57 and 58. In the present instance, the source of current is the secondary 59 of a transformer whose primary is connected to a primary source of alternating current. The switch 57 is arranged to control the initial energization of the motor 35 whose operation, for example, causes an increase in the amount of hot air supplied. This switch also serves to continue such energization and control the stopping of the motor 35 when the temperature of the air to which the thermostat responds has risen above the value predetermined by the setting of the thermostat.

Referring now to Fig. 8, the circuit through the switch 57 extends from the secondary 59, which has one grounded terminal, through a conductor 60, the switch 57, the thermostat tongue 56, a conductor 61, a normally closed switch 62, the winding 40 of the motor 35 to the grounded side of the motor unit 25. A similar circuit is provided for controlling the motor 36 by the switch 58 and this circuit extends from the thermostat tongue 56 through the switch 58, a conductor 63, a normally closed switch 64 to the winding 40 of the motor 36. The contacts of the thermostat are spaced apart a distance slightly greater than the thickness of the contact carried by the tongue 56 so that this contact may assume a midway position in which neither of the contact switches 57 or 58 will be closed. In other words, so long as the dampers are positioned to form mixed air of the desired temperature, neither of the switches 57 and 58 will be closed and both motor units will remain idle.

In order to prolong the life of the thermostat switches, separate means is provided for carrying the current for the motors 35 and 36 through the major portions of their operating cycles. This means comprises separate conductors 65 for bypassing the thermostat switches and in the case of the motor 35 includes a mechanically operated switch 66 interposed in the conductor 65 between the conductor 60 and the winding of said motor.

As shown in Fig. 8, the switch 66 comprises a stationary contact on a bar 67 coacting with a contact on a spring arm 68 which is tensioned to close the switch, the arm of the bar being supported on insulating members 69 (Fig. 5) between the upper ends of the plates 38. The arm 68 carries an insulating pad 70 and constitutes the follower of a cam 71 fast on the shaft 48. The cam has a lobe 72 which is shaped to open the switch 66 for a small part of each revolution of the shaft 48 thereby operating in the continued rotation of the motor 35 to periodically interrupt the current flow through the conductor 65. During such interruption, the motor is under the control of the thermostat switch 57 which, if open, causes the motor winding to be deenergized but if still closed, continues the rotation of the motor until the switch 66 again assumes control of the motor circuit. In this way, both the starting and stopping of the motor is controlled by the switch 57. A similar switch 73 for the motor 36 is interposed in the conductor 65 for such motor and arranged to be operated by a cam 74 on the shaft 48 of the motor unit 26, which shaft, it will be remembered, rotates in a direction reverse to that of the corresponding shaft of the motor unit 25.

The mechanism thus far described operates as follows, assuming, for example, that the hot and cold air dampers are partially open and producing mixed air at a temperature approximately that for which the thermostat is set. Under these conditions, both motors 35 and 36 would be at rest, the thermostat tongues 56 being positioned between the stationary contacts. When the temperature of the air to which the thermostat is exposed rises, as for example due to an increase in the temperature of the hot air, the thermostat tongue will move to close the switch 58 whereupon the circuit is completed through the then closed switch 64 and the winding of the motor 36, which is thereby started. Since the other motor would then be holding its terminal gear 31 against rotation, the drive by the motor 36 causes the shaft 19 to be advanced slowly in a direction to increase the proportion of cold air by further opening the cold air and closing the hot air ducts.

After a partial revolution of the cam 74, the switch 73 would be allowed to close, thereby establishing the running circuit for the motor through which the motor current would flow owing to the low resistance of the circuit thus established as compared to circuit through the thermostat switch 58. At the completion of one revolution of the shaft 48, the switch 73 would be opened by the lobe or cam 74 thereby transferring, for a short interval, the control of the motor 36 to the thermostat switch 58. If, in the small increment of movement of the dampers corresponding to a single revolution of the shaft 48, the temperature of the mixed air has been reduced sufficiently to open the switch 58, the motor circuit would be interrupted. Ordinarily, however, this would not be the case because of the small change in position of the dampers resulting from a single revolution of the shaft 48. Therefore, so long as the thermostat continues to call for colder air, the thermostat switch 58 will remain closed and will carry the motor current periodically during the intervals when the switch 73 is held open by the cam 74. In this way, the dampers are moved continuously until the temperature has been reduced to a point where the switch 58 is opened. Then, upon the next interruption of the running circuit by opening the switch 73, the motor 36 will be stopped.

Both motors then remain idle until the thermostat calls for more or less heat. If more heat is required, the tongue 56 will close the switch 57 thereby starting the motor 35 which, through the differential gear, drives the shaft 19 in a direction to increase the amount of hot air delivered to the duct 10. Such movement of the dampers continues for a number of revolutions of the shaft 48 determined by the time interval during which the switch 57 remains closed. As soon as the circuits controlled by the switches 57 and 73 are interrupted at the same time, the motor 35 is stopped and the dampers are maintained in the corresponding position.

It will be observed that the mechanism for operating the switches 66 and 73 for the different motor circuits is rendered extremely simple and reliable by the provision of two selectively operable shafts 48 each of which rotates in one direction only. This is made possible herein by splitting the speed reduction gearing and locating the slow speed shafts between the differential and the respective motors.

Under certain conditions, especially when the thermostat is located remotely from the outlet of the mixed air duct 10, there is danger that one damper may become completely opened without satisfying the requirement for hot or cold air determined by the thermostat. For example, in case a large room to be heated is very cold when the heating and ventilating system controlled by the present operator is started, the hot air damper may be completely opened without the desired room temperature having been reached.

In order that the present apparatus will function properly under the above conditions, the switches 62 and 64 in the motor circuits are arranged to be opened automatically and selectively when the shaft 19 has reached a limiting position in either direction of movement of the dampers. To this end, means is provided for opening the switch 62 when the hot air damper has been completely opened and for opening the switch 64 when the cold air damper reaches its open position. This means operates from the main shaft 19 and includes a rigid arm 75 thereon arranged to engage and lift a shoulder 76 on a member 77 slidably mounted in a vertical guide 78 (Fig. 5) on the frame of the motor unit 25. The lower end of this member is hook-shaped and adapted to engage a pad 79 on a flexible spring arm 80. Thus the switch 62 formed by contacts on the spring arm 80 and on a bar 81 will be opened when the member 77 is lifted. The switch 64 is mounted and constructed in a similar manner and adapted to be opened by an upward movement of a member 77 which is adapted to be lifted by an arm 82 on the shaft 19. The two arms 75 and 82 are arranged at right angles to each other and positioned to open their respective switches 62 and 64 when the hot air damper is in open and closed positions respectively.

To illustrate the operation of the limit switches, let it be assumed that the thermostat is calling for more heat when the supply of heated air has for some reason been interrupted. The motor 35 would continue to operate because of the continued closure of the switch 57. As the hot air damper approaches its completely opened position, the arm 75 would lift the member 77 opening the switch 62 and the circuit through the thermostat switch 57 thereby rendering this circuit inoperative and stopping the motor 35. Thus the hot air duct would remain open but when a quantity of hot air had passed therethrough sufficient to satisfy the requirements of the room, the switch 58 would start the motor 36 and move the hot air damper toward closed position. In the initial movement, the switch 62 would be allowed to close thereby establishing a normal condition of the control circuits.

In view of the substantial reduction in speed which must be effected in order to move the dampers at the desired slow rate, a safety device is provided between each motor and the shaft 19 to prevent damage to the dampers in case they become blocked accidentally. These devices are formed in the present instance, by the pinions 50 and collar 49 which disengage automatically when a condition of overload is encountered as determined by the stress under which the springs 51 are placed.

I claim as my invention:

1. A power unit for operating a damper device which is movable in opposite directions to vary the proportions of hot and cold air delivered through separate ducts, said unit combining two electric motors each adapted for unidirectional rotation, a differential gear having two terminal members each operatively connected to one of said motors and an intermediate member arranged to drive said device in one direction or the other depending upon which of said motors is operating, a thermal element responsive to the temperature of the air after mixing, and two switches operated selectively by said element and each controlling the duration of operation of one of said motors.

2. A power unit for operating a damper device which is movable in opposite directions to vary the proportions of hot and cold air delivered through separate ducts, said unit combining a driven shaft operatively connected to said device, two electric motors arranged for unidirectional rotation, means responsive to the temperature of the air after mixing to control the operation of said motors selectively, and a speed reduction gearing between said shaft and each of said motors operable to drive said shaft at a slow and graduated speed including a differential gear whose terminal members are permanently geared to the respective motors so as to drive the intermediate member in one direction or the other depending upon which of said motors is operating.

3. A power driving unit for dampers and the like combining a driven shaft connected to a damper to be operated, two electric motors having shafts disposed parallel to said driven shaft and drive gearing between said motors and said driven shaft including a spur gear differential having coaxially arranged terminal members and an intermediate member, the terminal members being driven by the respective motors and the intermediate member being connected to said driven shaft.

4. A power unit for operating a damper composed of a plurality of vanes arranged to move in unison about parallel axes to govern the flow of gaseous fluid through a conduit, said unit combining a stationary frame, a driven shaft on said frame having a driving connection with one of said vanes, a differential gearing mounted on said frame and having its intermediate member operatively connected to said shaft, and two motors constantly connected to the respective terminal members of said differential and operable selectively to drive said intermediate member in opposite directions.

5. A power operator for actuating a device which is movable in opposite directions to regulate the flow of a fluid combining a differential gearing having an intermediate member driven differentially from its two terminal members, said intermediate member being operatively connected to said device, and two electric motors each arranged to drive one of said terminal members.

6. A power operator for actuating a device which is movable in opposite directions to regulate the flow of a fluid combining two electric motors arranged for unidirectional rotation, and means providing a permanently established driving connection between each of said motors and said device and operable to drive said device differentially in opposite directions depending on which of said motors is operating.

7. An electrically operated damper regulator comprising, in combination with a rotary operating element, two electrically driven power units having shafts adapted to be driven unidirectionally but in opposite directions, and a speed reducing gear mechanism common to both of said units and adapted to be driven by such units selectively to rotate said element in one direction or the other.

8. An electrically operated damper regulator comprising, in combination with a rotary operating element, two electrically driven power units having shafts adapted to be driven unidirectionally but in opposite directions, and a speed reducing gear mechanism common to both of said units and adapted to be driven by such units selectively to rotate said element in one direction or the other, each of said power units including an electric motor having a drive shaft, and a speed reducing gear mechanism between its drive shaft and said driven shaft.

9. A power operator for a damper device controlling the temperature of air resulting from the mixing of hot and cold air currents, said operator combining an electric motor having an energizing winding, a speed reducing drive connection between said motor and said device for moving the latter in one direction to effect a slow and graduated change in the proportion of hot and cold air being mixed, a thermostat responsive to the temperature of the air whose temperature is to be regulated, and a control circuit through said motor winding including a switch governed by said thermostat and acting to control the starting of said motor and the duration of operation thereof in imparting variable advancing movements to said device, and means operable periodically in the operation of said motor controlled by closure of said switch to establish an auxiliary circuit through said motor winding and thereby decrease the current flowing through the thermostatic switch as long as said auxiliary circuit remains closed.

10. A power operator for actuating a device to regulate the flow of heating fluid combining two electric motors, a differential gearing having two terminal members and an intermediate member, the latter being operatively connected to said device, speed reducing mechanism connecting one of said motors with one of said terminal members, a separate speed reducing mechanism connecting the other motor to the other terminal member of the gearing, means responsive to the temperature of the heated medium whose temperature is to be controlled, means associated with one of said mechanisms and operable jointly with said temperature responsive means to govern the operation of one of said motors, and a smiliar means associated with said other speed reducing mechanism and operable jointly with said temperature responsive means to govern the operation of the other motor.

11. A power operator for a device operable to govern the proportion of hot and cold air delivered to an air supply duct combining an electric motor, means driven by said motor to move said device at a slow and graduated rate and thereby change the proportion of cold and hot air, a thermo-sensitive element responsive to the temperature changes of the air after mixing, two parallel circuits extending through the energizing winding of said motor and a source of electric current, one of said circuits including a switch arranged to be closed and opened by said element to govern the initiation and termination of the operation of said motor thereby determining the extent of movement of said device, a switch in said other circuit arranged to be closed and opened as an incident to the rotation of said motor whereby to reduce the flow of said current through said thermostatic switch periodically so long as said motor continues to operate.

12. A power operator of the character described combining a driven shaft adapted for operative association with a device to be actuated, an electric motor having a driving shaft, speed reducing mechanism providing a driving connection between said shafts and including a rotary element revoluble at a speed substantially greater than said driven shaft but less than said motor shaft, a thermo-sensitive switching device controlling a circuit through said motor and a source of said current, and switching means operable to establish an auxiliary circuit for conducting current through said motor, said last mentioned switching means being actuated from said rotary element in each revolution of the latter.

13. A power operator of the character described combining a shaft adapted for operative association with a device to be actuated, an electric motor having a driving shaft, speed reducing mechanism providing a driving connection between said shafts and including an intermediate shaft operable at a speed intermediate the speeds of said other shafts, a thermo-sensitive switching device controlling the starting and stopping of said motor, an auxiliary switch controlling the operation of said motor through an auxiliary circuit, and means operable in the rotation of said intermediate shaft to open and close said auxiliary switch and thereby transfer the control of the motor periodically to said switching device.

14. A power operated mechanism for actuating a device to regulate the flow of heating fluid combining an electric motor arranged to drive said device to effect a slow and graduated movement thereof, thermo-responsive means, a switch controlled thereby and controlling a circuit through the energizing winding of said motor to initiate the operation of the motor and also to terminate such operation so as to define the length of movement imparted to said device, an auxiliary circuit through said winding, a switch controlling the establishment of said auxiliary circuit, and means operable in the continuous rotation of the motor to maintain said second switch closed during the major portion of the operating cycle of the motor and to momentarily and periodically open said switch so as to transfer the control of the motor to said first mentioned switch.

15. A power operator for actuating a device to regulate accurately the flow of a heating fluid combining an electric motor mechanism operated by said motor and arranged to drive said device at a slow and graduated speed, a thermo-sensitive means controlling the starting and stopping of said motor, a second switching means controlling the operation of said motor independently of said first mentioned switching means, and means operable in the continuous rotation of the motor to open said second switching means in periodically recurring intervals corresponding to short increments of movement of said device whereby to transfer the control of the motor momentarily to said first mentioned switching means.

16. A power operator for actuating a device for regulating the flow of a heating fluid combining an electric motor arranged to drive said device at a slow and graduated speed, thermo-sensitive switching means controlling the starting of the motor, auxiliary switching means controlling the application of electrical energy to said motor and operable to control the stopping of the motor only when the circuit through said thermo-sensitive switching means is open, and means operable as an incident to the operation of the motor to govern the actuation of said auxiliary switching means.

17. A power operator for actuating a device regulating the flow of heating fluid through a duct combining an electric motor, a shaft driven by said motor at a reduced speed and operatively associated with said device so as to oscillate through a fraction of one revolution in moving said device from closed to open position or vice versa, a circuit for controlling the starting and duration of operation of said motor including a thermo-responsive switch the closure of which initiates operation of the motor and the opening of which with said device between said closed and open positions interrupts the motor operation, said circuit also including a normally closed switch, and means rotatable with said shaft and operable to open said last mentioned switch when said device reaches a limiting position while moving in one direction.

18. A power operator for moving a damper device in a fluid conduit between open and closed positions combining two electric motors operable individually to advance the device in opposite directions, two independent electric circuits each controlling the operation of one of said motors and each including two switches one of which is normally closed, a thermostatic element for actuating the other of said switches in said circuits selectively, and means movable in unison with said device and arranged to open one of said normally closed switches when the device approaches the limit of its movement in one direction and to open the other normally-closed switch when said device approaches the limit of its movement in the opposite direction.

19. An operator for actuating a damper device to regulate the temperature of an air current resulting from a mixing of hot and cold air, said operator combining power driving means operatively connected to said device to effect a slow and graduated movement thereof in opposite directions between two limiting positions, a thermostatic element responsive to the temperature of the air after mixing, two switches arranged to be actuated selectively by said element and when closed with said device intermediate said positions to control the starting of said driving means and thereby initiate movement of said device in one direction or the other depending on which of said switches is closed, and means operable automatically to render one of said switches ineffectual when said device has reached a limiting position while moving in one direction and to render the other of said switches ineffectual when said device has reached a limiting position while moving in the other direction.

20. An electric operator for actuating a valve member combining a rotary element adapted upon rotation in opposite directions to move said member toward valve-closed and valve-open positions respectively, motor means for driving said element including two windings each adapted when energized to cause said motor means to advance said element in one direction depending on which of the windings is energized, two electrical circuits each associated with one of said windings, two switches one in each of said circuits adapted when closed to energize one of said windings and thereby initiate rotation of said element in one direction, the duration of closure of said switch determining the extent of movement of said member, a thermo-responsive device for actuating said switches selectively according to temperature changes in the medium to which the device is exposed, two auxiliary circuits each adapted when closed to cause one of said windings to be energized independently of its thermostatic switch, and means operated by said motor means when rotating in either direction to close one of said auxiliary circuits periodically and thereby relieve the flow of current through the controlling thermostatic switch.

21. An electric operator for actuating a valve member combining a rotary element adapted upon rotation in opposite directions to move said member toward valve-closed and valve-open positions respectively, motor means for driving said element including two windings each adapted when energized to cause said motor means to advance said element in one direction depending on which of the windings is energized, two electrical circuits each associated with one of said windings, and two switches one in each of said circuits adapted when closed to energize one of said windings and thereby initiate rotation of said element in one direction, the duration of closure of said switch determining the variable extent of the movement of said member.

22. An electric operator for actuating a valve member combining a rotary element adapted upon rotation in opposite directions to move said member toward valve-closed and valve-open positions respectively, motor means for driving said element including two circuits controlling said motor means and each adapted when closed to initiate operation of the motor means to rotate said element in a direction determined by which of said circuits is closed, a thermo-responsive device, two switches arranged to be closed selectively by said device to determine the starting and duration of operation of the motor means to cause movement of said element in one direction or the other, two auxiliary circuits for controlling said motor means each adapted when closed to cause rotation of said element in one direction or the other independently of the condition of the thermostatic switch controlling such motion, and means operated by said motor means when driving said element in either direction to maintain one of said auxiliary circuits closed for the major portion of the time but to open such circuit periodically whereby to transfer the control of the motor operation momentarily back to the associated thermostatic switch.

In testimony whereof, I have hereunto affixed my signature.

DUNCAN J. STEWART.